United States Patent
Wang et al.

(10) Patent No.: US 11,597,388 B2
(45) Date of Patent: Mar. 7, 2023

(54) SYSTEM AND METHOD FOR CONNECTED VEHICLE LANE MERGE

(71) Applicant: Toyota Motor Engineering & Manufacturing North America, Inc., Plano, TX (US)

(72) Inventors: Ziran Wang, San Jose, CA (US); Kyungtae Han, Palo Alto, CA (US); Prashant Tiwari, Santa Clara, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 143 days.

(21) Appl. No.: 17/031,095

(22) Filed: Sep. 24, 2020

(65) Prior Publication Data

US 2022/0089164 A1 Mar. 24, 2022

(51) Int. Cl.
*B60W 30/09* (2012.01)
*B60W 30/18* (2012.01)
*B60W 30/095* (2012.01)

(52) U.S. Cl.
CPC ...... *B60W 30/18163* (2013.01); *B60W 30/09* (2013.01); *B60W 30/0953* (2013.01); *B60W 2520/105* (2013.01); *B60W 2554/404* (2020.02)

(58) Field of Classification Search
CPC ........... B60W 30/18163; B60W 30/09; B60W 30/0953; B60W 2520/105; B60W 2554/404; B60W 60/0015; B60W 2720/106
See application file for complete search history.

(56) References Cited

U.S. PATENT DOCUMENTS

| 10,062,288 | B2 | 8/2018 | Litkouhi et al. |
| 11,093,829 | B2 * | 8/2021 | Hu .................. B60W 10/18 |
| 2014/0195093 | A1 | 7/2014 | Litkouhi et al. |
| 2019/0299984 | A1 * | 10/2019 | Shalev-Shwartz ............... B60W 50/0097 |
| 2019/0329783 | A1 * | 10/2019 | Shalev-Shwartz ... G05D 1/0253 |

(Continued)

OTHER PUBLICATIONS

Wang et al., "Game theoretic approach for predictive lane-changing and car-following control," Transportation Research Part C: Emerging Technologies, Vo. 58, 24 pages (2015).

(Continued)

*Primary Examiner* — Jason Holloway
(74) *Attorney, Agent, or Firm* — Christopher G. Darrow; Darrow Mustafa PC (57) ABSTRACT

In one embodiment, a vehicle merge control system generates sensor data that indicate a detected vehicle in an environment of the ego vehicle, identifies a conflict based at least in part on the sensor data indicating that the detected vehicle and the ego vehicle are traveling: 1) in adjacent lanes that will merge into a single lane, and 2) at respective speeds that will result in the detected vehicle entering within a threshold range of the ego vehicle, determines, upon identification of the conflict, merge position assignments for the ego vehicle and the detected vehicle based at least in part on a game theory cost function applied to game theory actions that result in the merge position assignments exclusively being either a lead vehicle or a follower vehicle, and outputs an acceleration rate to achieve the merge position assignment for the ego vehicle.

20 Claims, 6 Drawing Sheets

(56) References Cited

U.S. PATENT DOCUMENTS

2021/0146964 A1* 5/2021 Rus .................. B60W 60/0015

OTHER PUBLICATIONS

Yoo et al., "A Stackelberg Game Theoretic Model of Lane-Merging," Computer Science, Engineering, Mathmatics, ArXiv, 12 pages (2020).

Li et al., "Game-Theoretic Modeling of Driver and Vehicle Interactions for Verification and Validation of Autonomous Vehicle Control Systems," pp. 1-13, arXiv: 1608.08589v1 [cs.AI] Aug. 30, 2016.

Hang et al., "Human-Like Decision Making for Autonomous Driving: A Noncooperative Game Theoretic Approach," 11 pages, arXiv:2005.11064 [cs.RO] (2020).

Kita, Hideyuki, "A merging-giveway interaction model of cars in a merging section: a game theoretic analysis," Transportation Research Part A: Policy and Practice, Elsevier, vol. 33(3-4), pp. 305-312 (1999—Abstract).

Liu et al., "A Game Theoretical Approach for Modeling Merging and Yielding Behavior at Freeway On-Ramp Section," Transportation and Traffic Theory 2007, pp. 1-15.

Kang et al., "A Repeated Game Freeway Lane Changing Model," Sensors 2019, 19, 34 pages (2019).

Jing et al., "Cooperative Game Approach to Optimal Merging Sequence and on-Ramp Merging Control of connected and Automated Vehicles," IEEE Transactions on Intelligent Transportation Systems, vol. 20, Issue 11, pp. 1-11 (2019).

* cited by examiner

SYSTEM AND METHOD FOR CONNECTED VEHICLE LANE MERGE

TECHNICAL FIELD

The subject matter described herein relates, generally, to systems and methods for automating or recommending actions in a vehicle merge maneuver, and more particularly, to systems and methods that implement a game-theory based ramp merging strategy to determine safe positions and accelerations to execute a merge.

BACKGROUND

Lane merging, and ramp merging in particular, can be a major cause of traffic congestion and source of accidents due to lack of clear, cooperative guiding instructions and the generally chaotic nature of merging. Strategies to handle merging can be improved when connected and automated vehicles (CAV) are involved.

SUMMARY

The disclosed apparatuses, methods and systems relate to a vehicle merge control system that uses game theory to determine recommended actions for a vehicle to execute a merge maneuver.

In one embodiment, the disclosed vehicle merge control system includes one or more sensors that generate sensor data that indicate a detected vehicle in an environment of the ego vehicle and one or more processors. The system further includes a memory communicably coupled to the one or more processors. The memory stores a conflicts module including instructions that when executed by the one or more processors cause the one or more processors to determine, based at least in part on the sensor data, that a conflict exists based on determining that the detected vehicle and the ego vehicle are traveling: 1) in adjacent lanes that will merge into a single lane, and 2) at respective speeds that will result in the detected vehicle entering within a threshold range of the ego vehicle. The memory further stores a game theory decision module including instructions that when executed by the one or more processors cause the one or more processors to determine, when a conflict exists, merge position assignments for the ego vehicle and the detected vehicle based at least in part on a game theory cost function applied to game theory actions that result in the merge position assignments exclusively being either a lead vehicle or a follower vehicle. The memory also stores an acceleration control module including instructions that when executed by the one or more processors cause the one or more processors to output an acceleration rate to achieve the merge position assignment for the ego vehicle.

In one embodiment, a method of controlling a merge maneuver for an ego vehicle includes generating sensor data that indicate a detected vehicle in an environment of the ego vehicle, identifying a conflict based at least in part on the sensor data indicating that the detected vehicle and the ego vehicle are traveling: 1) in adjacent lanes that will merge into a single lane, and 2) at respective speeds that will result in the detected vehicle entering within a threshold range of the ego vehicle, determining, upon identification of the conflict, merge position assignments for the ego vehicle and the detected vehicle based at least in part on a game theory cost function applied to game theory actions that result in the merge position assignments exclusively being either a lead vehicle or a follower vehicle, and outputting an acceleration rate to achieve the merge position assignment for the ego vehicle.

In one embodiment, a non-transitory computer-readable medium for controlling a merge maneuver for an ego vehicle includes instructions that, when executed by one or more processors, cause the one or more processors to obtain sensor data that indicate a detected vehicle in an environment of the ego vehicle, identify a conflict based at least in part on the sensor data indicating that the detected vehicle and the ego vehicle are traveling: 1) in adjacent lanes that will merge into a single lane, and 2) at respective speeds that will result in the detected vehicle entering within a threshold range of the ego vehicle, determine, upon identification of the conflict, merge position assignments for the ego vehicle and the detected vehicle based at least in part on a game theory cost function applied to game theory actions that result in the merge position assignments exclusively being either a lead vehicle or a follower vehicle, and output an acceleration rate to achieve the merge position assignment for the ego vehicle.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with a vehicle merge control system are disclosed. The disclosed embodiments include a vehicle merge control system that uses a game theory-based merging strategy developed to identify and execute safe merging maneuvers between CAVs by determining a dynamic merging sequence and a corresponding longitudinal/lateral control. The disclosed strategy improves safety and efficiency of a merging process in multiple ways, for example, by ensuring a safe inter-vehicle distance among the involved vehicles and harmonizing the speed of CAVs in the traffic stream.

Figure 1:
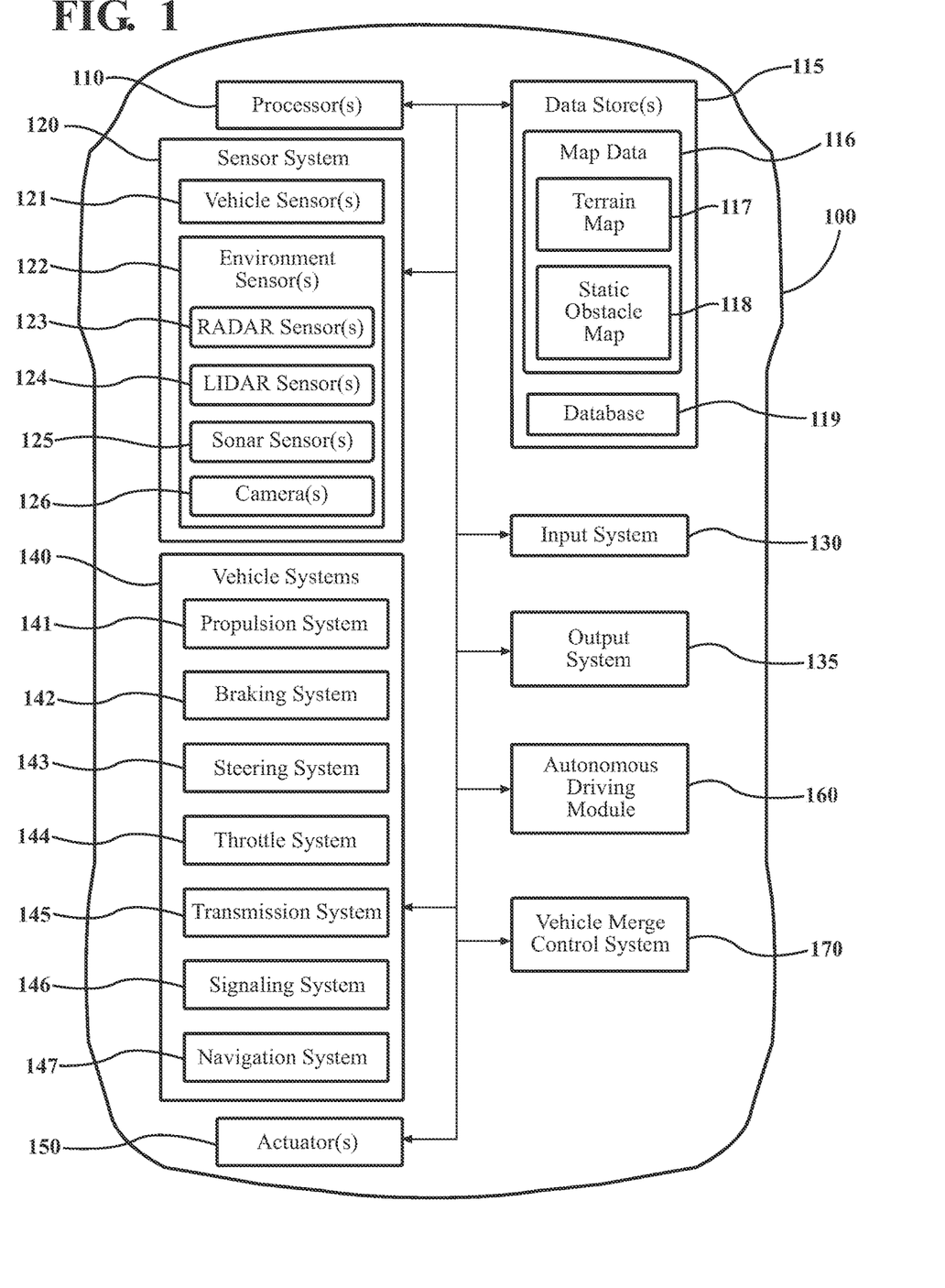
FIG. 1 illustrates one embodiment of a vehicle within which embodiments disclosed herein may be implemented.

Referring to FIG. 1, an example of a vehicle 100 that can implement one or more of the disclosed embodiments is illustrated. As used herein, a "vehicle" is any form of transport that is used for moving people, animals, goods, or the like. In one or more implementations, the vehicle 100 is an automobile. The vehicle 100 can be a CAV. As used herein, a CAV (i.e., connected automated vehicle) refers to a network-connected, sensor-equipped vehicle that can be driven manually, autonomously or semi-autonomously. While arrangements will be described herein generally with respect to automobiles, it should be understood that the scope of the disclosed subject matter is not limited to automobiles. In some implementations, the vehicle 100 may be any form of powered, multi-wheeled transport or vehicle that may need to execute a merge maneuver and thus can benefit from the functionality discussed herein.

As shown in FIG. 1, the vehicle 100 includes multiple elements. It should be understood that in various embodiments the vehicle 100 may not necessarily include all of the elements shown in FIG. 1. The vehicle 100 can have any combination of the various elements shown in FIG. 1. Further, the vehicle 100 can have other elements in addition to those shown in FIG. 1. In some arrangements, the vehicle 100 may be implemented without one or more of the elements shown in FIG. 1. While the various elements are shown as being located within the vehicle 100 in FIG. 1, it should be understood that one or more of these elements can be located external to the vehicle 100. Further, the elements shown may be physically separated by large distances.

Some of the possible elements of the vehicle 100 are shown in FIG. 1 and will be described along with subsequent figures. However, a more detailed description of many of the elements in FIG. 1 will be provided after the discussion of FIGS. 2-6 for purposes of brevity in this description. For simplicity and clarity of illustration, where appropriate, reference numerals have been repeated among the different figures to indicate corresponding or analogous elements. In addition, while the discussion outlines numerous specific details to provide a thorough understanding of the embodiments described herein, those of ordinary skill in the art will understand that the embodiments described herein may be practiced using various combinations of these elements.

In any case, the vehicle 100 includes a sensor system 120 and a vehicle merge control system 170 that is implemented to perform methods and other functions as disclosed herein relating to determining a position for the vehicle 100 to safely execute a merge maneuver and a recommended acceleration for the vehicle 100. The noted functions and methods will become more apparent in the following discussion of the figures.

Figure 2:
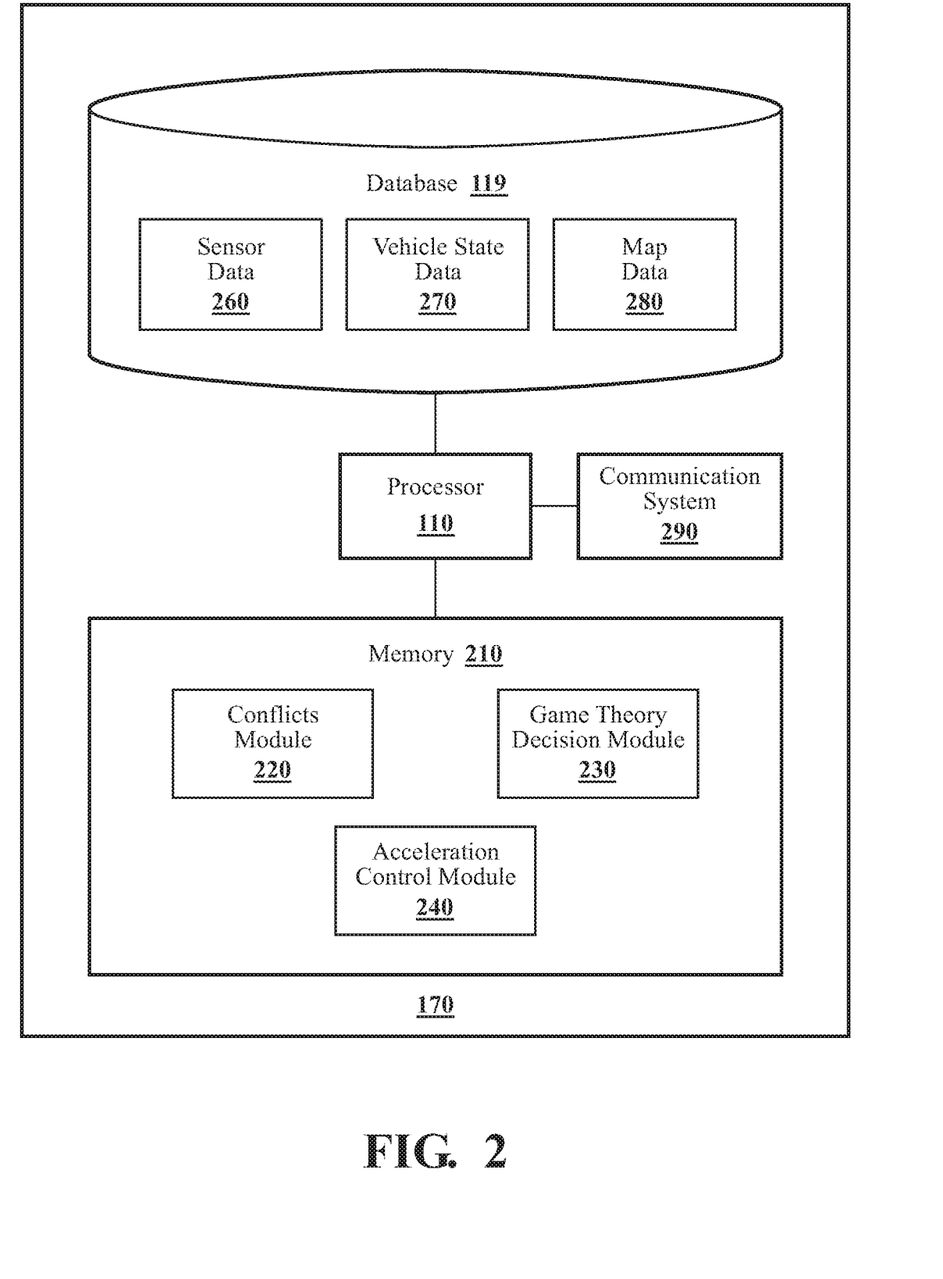
FIG. 2 illustrates one embodiment of a vehicle merge control system according to the disclosed subject matter.

With reference to FIG. 2, one embodiment of an implementation of the vehicle merge control system 170 of FIG. 1 is illustrated. The vehicle merge control system 170 is shown as including a processor 110 and database 119 from the vehicle 100 of FIG. 1. Accordingly, the processor 110 may be a part of the vehicle merge control system 170, the vehicle merge control system 170 may include a processor separate from the processor 110 of the vehicle 100 or the vehicle merge control system 170 may access the processor 110 through a data bus or another communication path.

The vehicle merge control system 170 includes a database 119 that stores, among other things, sensor data 260 (e.g., generated from sensor system 120 of FIG. 1), vehicle state data 270 (e.g., data indicating locations, speed, etc., of other vehicles), and map data 280 (e.g., detailed map information that can be drawn from map data 116 in combination with other sources), each of which will be discussed further below. The database 119, in one embodiment, is constructed as an electronic data structure stored in the memory 210 or another data store, such as the vehicle 100 data store 115, a cloud-based storage, a removable memory device, or another suitable location that is accessible to the modules 220, 230 and 240. The database 119 is configured with routines that can be executed by the processor 110 for analyzing stored data, providing stored data, organizing stored data, and so on. Thus, in one embodiment, the database 119 stores data described above (as well as other data) used by the modules 220, 230 and 240 in executing various functions.

Additionally, the vehicle merge control system 170, in one or more embodiments, includes a memory 210 that stores a conflicts module 220, a game theory decision module 230, and an acceleration control module 240. The memory 210 can be constructed as a random-access memory (RAM), read-only memory (ROM), a hard-disk drive, a flash memory, or other suitable memory for storing the modules 220, 230 and 240.

The vehicle merge control system 170 can also include a communication system 290 that allows the vehicle merge control system 170 to transmit/receive data and communicate, for example, with other vehicles, communication networks, server systems, and other systems. The communication system 290 can be implemented, for example, as a wireless communication system including one or more transmitting/receiving devices, one or more transmitting/receiving antennas and a controller for transmitting and receiving data over a wireless network using any of a variety of protocols, such as vehicle-to-vehicle (V2V), vehicle-to-everything (V2X), general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), Wibree, and/or any other wireless protocol. In one or more embodiments, the communication system 290 can be configured to receive, for example, vehicle state data 270 from one or more other vehicles detected in a vicinity around the vehicle 100.

The modules 220, 230 and 240 are, for example, constructed as computer-readable instructions that when executed by the processor 110 cause the processor 110 to perform the various functions disclosed herein.

The conflicts module 220 is generally constructed including instructions that function to control the processor 110 to determine, based at least in part on the sensor data 260, that a detected vehicle and the ego vehicle 100 are traveling, in adjacent lanes that will merge into a single lane, at speeds that will result in the detected vehicle entering within a threshold range of the ego vehicle 100 and thus a conflict exists.

The game theory decision module 230 is generally constructed including instructions that function to control the processor 110 to determine, when a conflict exists and based at least in part on a game theory cost function, positions to respectively and exclusively assign to the ego vehicle 100 and the detected vehicle, where each position can be either a lead vehicle or follower vehicle.

The acceleration control module 240 is generally constructed including instructions that function to control the processor 110 to determine an acceleration corresponding to achieving the position assigned to the ego vehicle 100 as the ego vehicle 100 and the detected vehicle merge from separate lanes into a single lane.

Figure 3:
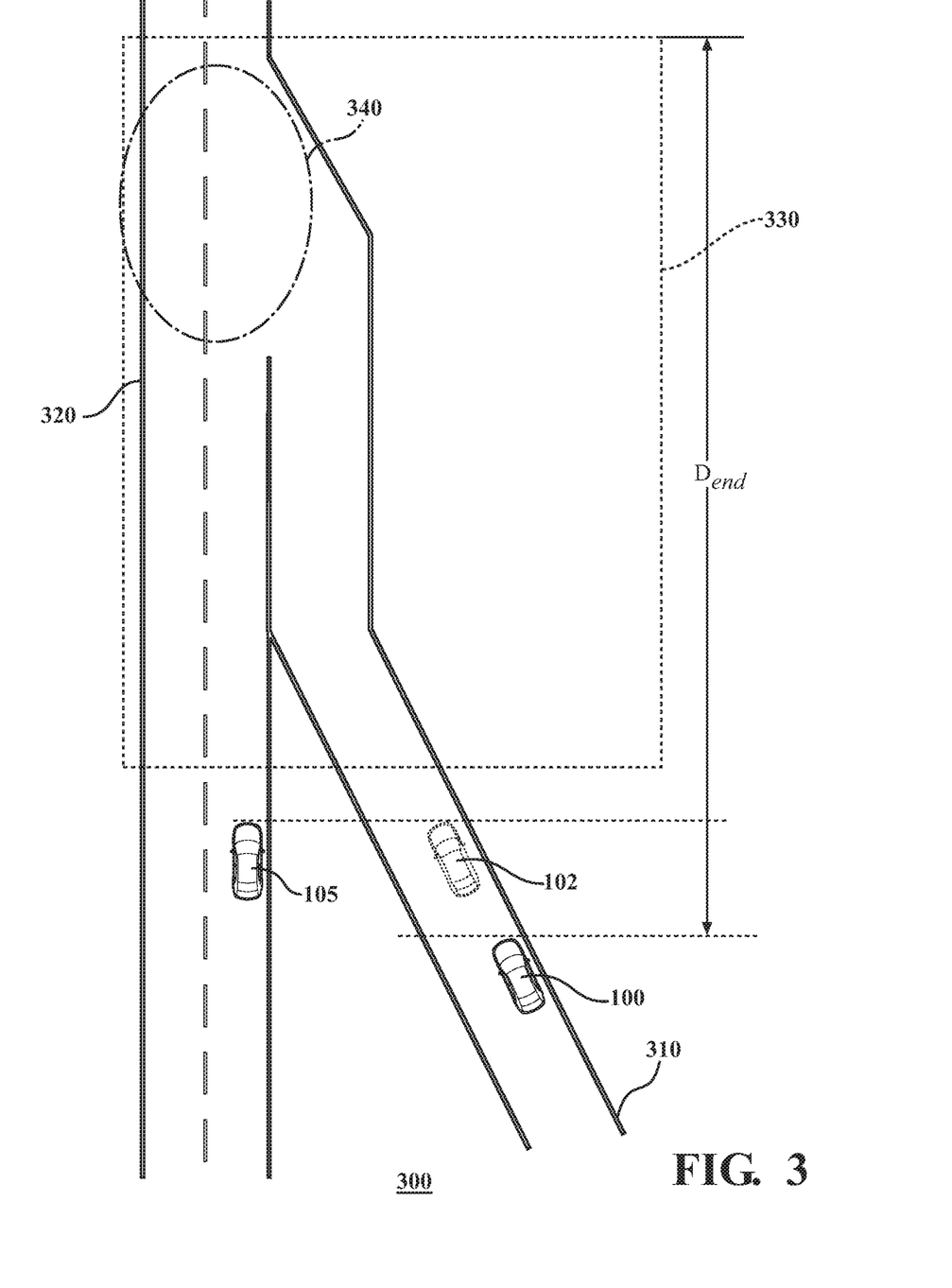
FIG. 3 illustrates an example merge operation according to the disclosed subject matter.

As used herein and illustrated in FIG. 3, a "merge lane" or "ramp" (e.g., merge lane 310) refers to a lane of a road or highway that ends by merging into another lane. A "mainline" (e.g., mainline 320) refers to a lane of a highway that a merge lane merges into. That is, as used herein, a merge lane joins and eventually ends at a mainline. Jointly, the mainline and the merge lane form a "merge area" (e.g., merge area 330) which refers to the length of road or highway that extends from a point approximately aligned with a beginning of the merge lane to the dissolution of the merge lane into the mainline. A "merge point" (e.g., merge point 340) refers to the actual location where the merge takes place.

FIG. 3 illustrates an example merge operation scene 300 according to the disclosed embodiments. A conflict arises in a merge area 330 when a vehicle 100 traveling in the merge lane 310 is on a potential collision course with a vehicle 105 (i.e., a competitor vehicle) traveling in the mainline 320. Both vehicles (100, 105) may include an implementation of the vehicle merge control system 170 and communicate to cooperatively determine an outcome to avoid collision. However, for the sake of simplicity in describing various features of the disclosed subject matter, the vehicle merge control system 170 will be described primarily from the perspective of one vehicle, i.e., vehicle 100 (which may also be referred to as the "ego" vehicle 100) that is implementing the vehicle merge control system 170.

From implementation in vehicle 100, the vehicle merge control system 170 can automatically detect and predict conflicts, for example, by analyzing sensor data 260 that indicates a position and a trajectory of the competitor vehicle 105 or by communicating with the competitor vehicle 105 to receive position and trajectory information directly, e.g., via V2V communication. As will be discussed further below, in one or more embodiments the vehicle merge control system 170 can project the position of vehicle 100 and the position of the competitor vehicle 105 into future points in time to check whether the competitor vehicle 105 (and similarly any other detected vehicles) will enter within a threshold safety distance of the ego vehicle 100.

Generally, to resolve a conflict in the merge area 330 at least one of the mainline vehicle (e.g., competitor vehicle 105 in the illustrated example) and the merge lane vehicle (e.g., ego vehicle 100 in the illustrated example) will need to adjust its speed to complete a safe merging sequence that avoids collision. To facilitate the safe merging sequence, the vehicle merge control system 170 characterizes the two conflict vehicles (100, 105) as competitors in a two-player game and evaluates their situation (e.g., based on speed, position, risk, etc.) using a cost function, as will be discussed further below, to decide which vehicle should go first.

The vehicle merge control system 170 can, for example, refer to the ego vehicle 100 as player 1 (P1) and refer to its competitor vehicle 105 as player 2 (P2). In the game, both P1 and P2 can choose to be either a leader (i.e., the front position in a merge sequence) or a follower (i.e., the rear position in a merge sequence), with the action set given as:

A(P1)={1: To be the leader,2: To be the follower} for P1, and

A(P2)={1: To be the leader,2: To be the follower} for P2.

Although the action sets are identical, P1 and P2 can operate under differing intentions and contexts. For example, the vehicle merge control system 170 is designed with consideration of the fact that mainline vehicles generally can have motivations different from those merge lane vehicles. For example, mainline vehicles/drivers may feel entitled to a right-of-way and attempt to drive safely but without compromising in travel speed. On the other hand, merge lane vehicles/drivers may worry about the remaining distance to the end of the merging area 330. As the remaining distance decreases, the merging urgency of the merge lane vehicle may grow, and this anxiety can be expressed as the risk value in the cost function.

The vehicle merge control system 170 can evaluate all possible actions in the game for risk analysis in a given timestep and reevaluate the actions periodically at one or more subsequent timesteps (e.g., every three seconds, every five seconds, etc.). For each action in the game, the vehicle merge control system 170 can determine a corresponding recommended acceleration. Details regarding techniques for determining a recommended acceleration will be discussed further below with reference to FIG. 3. Based in part on the recommended acceleration, the vehicle merge control system 170 can predict a corresponding time-to-collision (TTC) in the next timestep of each action. In one or more embodiments, the predicted TTC for any pair of players (i.e., a preceding vehicle and a following vehicle) can be formulated as Equation 1:

$$TTC_{predict} = \frac{\text{Gap} + \Delta\text{Gap}(a, \Delta t)}{v_f + \Delta v_f(v_p - \Delta v_p)}, \text{ if } v_f + \Delta v_f > v_p - \Delta v_p \qquad \text{Eq. 1}$$

where Gap is the size of the gap between the preceding vehicle and the following vehicle, $v_f$ is the speed of the following vehicle, $v_p$ is the speed of the preceding vehicle, a is the suggested acceleration and $\Delta t$ is the timestep.

While predicted TTC provides an indication of safety risk, predicted TTC alone may not be enough to accurately quantify the safety risk. For example, if a preceding vehicle is traveling faster than a following vehicle, predicted TTC will be negative. Moreover, a relatively small difference between $v_f$ and $v_p$ can result in a relatively large predicted TTC that may appear to indicate safety even though the inter-vehicle gap is small. The vehicle merge control system 170 can mitigate this problem by combining a predicted TTC and with a predicted time headway $h_{predict}$, defined as:

$$h_{predict} = \frac{\text{Gap} + \Delta\text{Gap}(a, \Delta t)}{v_e + \Delta v_e} \qquad \text{Eq. 2}$$

Thus, the vehicle merge control system 170 can evaluate risk for each action according to Equations 3 and 4:

$$\text{risk}_l = \frac{\left(1 - \tanh\left(\frac{TTC_{predict}}{t_h}\right) + 1 - \tanh\left(\frac{h_{predict}}{t_h}\right)\right)}{2}, \qquad \text{Eq. 3}$$
$$\text{if } v_e + \Delta v_e > v_c + \Delta v_c$$

$$\text{risk}_l = 1 - \frac{\left(1 + \tanh\left(\frac{h_{predict}}{t_h}\right)\right)}{2}, \text{ if } v_e + \Delta v_e < v_c + \Delta v_c \qquad \text{Eq. 4}$$

where $h_{predict}$, $v_e$, and $v_c$ are the predicted time headway of ego vehicle 100, the speed of ego vehicle 100, and the speed of competitor vehicle 105, respectively, and $t_h$ is the minimum safe time headway, for example, based on the 3-second rule.

To consider the merging urgency of merge lane vehicles, the vehicle merge control system 170 can include a distance to the end of merge area 330 in the risk value of the merge lane vehicle, as shown in Equation 5. The closer the players are to the end of the merge area 330, the higher the cost the merge lane vehicle should estimate:

$$\text{risk}_{d2e} = \frac{1 - \left(\tanh\left(\frac{h_{ending}(t)}{t_h}\right)\right)}{2} \qquad \text{Eq. 5}$$

where $$h_{ending}(t) = \frac{D_{end}}{v_{ramp}}$$

is the remaining time headway to the end of merge area 330 for the merge lane vehicle, $D_{end}$ is the remaining distance to the end of the merge area 330, as shown in FIG. 3, and $v_{ramp}$ is the speed of the vehicle in the merge lane 310 (e.g., vehicle 100). The vehicle merge control system 170 can determine the relevant distances based, for example, on sensor data 260 and/or map data 280.

The vehicle merge control system 170 can also consider saving travel time as another strategic target for the players. For example, a solution that only considered safety could conceivably always assign the ego vehicle 100 a follower position in the game, as this would normally be the safest option. However, such a simplistic and overly conservative approach would result in unnecessary congestion, as any/all vehicles implementing such a solution would opt to slow down even in situations in which they could accelerate and take the lead position without exposure to significant safety risk.

To counter the conservative bias that a safety-focused strategy can introduce, in one or more embodiments the vehicle merge control system 170 can add a mobility term to push the ego vehicle 100 to find a viable balance between safety and speed, and thereby improve overall traffic efficiency at the same time. In this manner, in any implementation both mainline and merge lane vehicles are pushed to take actions that result in smaller decreases in speed. As shown in Equation 6, the disclosed mobility term adds more cost to a decelerating action:

$$\text{Mobility} = \frac{\left(1 - \tanh\left(\frac{\Delta v_e}{v_e}\right)\right)}{2} \qquad \text{Eq. 6}$$

where $\Delta v$ is the speed difference of either being a follower or a leader in the game. The term $$\tanh\left(\frac{\Delta v_e}{v_e}\right)$$

is more sensitive when the speed of the ego vehicle 100 is slow, as this algorithm prioritizes mobility in low speed driving, but prioritizes safety in high speed driving.

Accordingly, in one or more embodiments the vehicle merge control system 170 can define a cost function of a mainline vehicle (e.g., vehicle 105) as:

$$\text{Cost}^{ML}(v_e, v_c, a, \Delta t) = \text{risk}_1^{ML} + \text{Mobility}^{ML} \qquad \text{Eq. 7}$$

Correspondingly, the vehicle merge control system 170 can define a cost function of a merge lane vehicle (e.g., vehicle 100) as:

$$\text{Cost}^{Ramp}(v_e, v_c, a, \Delta t, D_{end}) = \frac{\left(\text{risk}_1^{Ramp} + \text{risk}_{d2e}\right)}{2} + \text{Mobility}^{Ramp} \qquad \text{Eq. 8}$$

After obtaining the cost for each player's actions, the vehicle merge control system 170 can determine an optimal result, for example, based on a decision table. In one or more embodiments the vehicle merge control system 170 can formulate the decision table based on the type of game, which may be considered as either a non-cooperative or a cooperative game. A game formed between a CAV and a legacy vehicle (i.e., manually driven vehicle) may be defined as a non-cooperative two-player game in which players make decisions on their own. A game between two CAVs (i.e., two autonomous vehicles) may be defined as a cooperative game in which players share their cost and make decisions together.

The decision table of the non-cooperative game between a CAV and a legacy vehicle is shown in Table 1:

TABLE 1

Cost table for non-cooperative two-person game

|  | | Competitor | |
| --- | --- | --- | --- |
| | Role | Leader | Follower |
| Ego vehicle | Leader | ∞ | $\text{Cost}_{lead}^{Ramp}$ or $\text{Cost}_{lead}^{ML}$ |
| | Follower | $\text{Cost}_{follow}^{Ramp}$ or $\text{Cost}_{follow}^{ML}$ | ∞ |

As indicated in Table 1, to avoid a collision the ego vehicle 100 and the competitor vehicle 105 are not allowed to be leader or follower at the same time, thus the cost for these two cases are set to infinity or a very large number. At each timestep, the ego vehicle 100 will choose the option with the minimum expected cost, as described in Equation 9.

$$\text{Action} = \min_{actions}\left\{\text{Cost}_{Ramp}^{follow} \text{ or } \text{Cost}_{ML}^{follow}, \text{Cost}_{Ramp}^{lead} \text{ or } \text{Cost}_{ML}^{lead}\right\} \qquad \text{Eq. 9}$$

In contrast to the non-cooperative game, which can only provide the local optimal solution to the competition regardless of system conditions, a cooperative game for two CAVs (i.e., two vehicles that can communicate wirelessly, e.g., via V2V transmissions) can be solved with the cost table shown in Table 2. The cost of being a follower for the ego vehicle 100 ($\text{Cost}_{follow}^{ego}$) is chosen from either $\text{Cost}_{follow}^{Ramp}$ or $\text{Cost}_{follow}^{ML}$ based on its position on the road, and likewise for the cost of the competitor vehicle 105 ($\text{Cost}_{lead}^{com}$).

TABLE 2

Cost table for cooperative two-person game

| | | Competitor | |
|---|---|---|---|
| | Role | Leader | Follower |
| Ego vehicle | Leader | ∞ | $Cost_{lead}^{ego}$ + $Cost_{follow}^{com}$ |
| | Follower | $Cost_{follow}^{ego}$ + $Cost_{lead}^{com}$ | ∞ |

In the case of a cooperative game, the two players can communicate to share the cost with each other and are able to collaboratively make a decision based on the sum cost of both players, for example as described in Equation 10, to achieve an optimal outcome.

$$\text{Action} = \min_{actions} \{Cost_{follow}^{ego} + Cost_{lead}^{com}, Cost_{lead}^{ego} + Cost_{follow}^{com}\} \quad \text{Eq. 10}$$

Referring to FIG. 3, in one or more embodiments the system can determine a recommended acceleration based in part on a speed of a preceding vehicle (e.g., vehicle 105). In the case that the ego vehicle and preceding vehicle are not in the same lane, the vehicle merge control system 170 can project the preceding vehicle as a virtual vehicle 102 on the ego vehicle lane, with the virtual vehicle having the same longitudinal speed and position as the preceding vehicle.

In one or more embodiments, the vehicle merge control system 170 calculates longitudinal positions for each vehicle based on their respective distance to the merging point 340, determined based on sensor data 260 and/or map data 280. In this manner the relative longitudinal position between any two vehicles is the difference between their distances to the merging point 340. After the preceding vehicle of the ego vehicle 100 is identified, the vehicle merge control system 170 can apply a consensus-based longitudinal controller that will allow the ego vehicle to cooperatively merge with the preceding vehicle before reaching the merging point 340. In this manner, the possibility of rear-end or side collisions in the merge area 330 will be largely decreased.

First, the longitudinal dynamics of a vehicle i can be given as the following equations:

$$\dot{r}_i(t) = v_i(t) \quad \text{Eq. 11}$$

$$\dot{v}_i(t) = a_i(t) \quad \text{Eq. 12}$$

$$a_i(t) = \frac{1}{m}[F_{net_i}(t) - R_i T_{br_i}(t) - c_{vi}v_i(t)^2 - c_{pi}v_i(t) - d_{mi}(t)] \quad \text{Eq. 13}$$

where $r_i(t)$, $v_i(t)$ and $a_i(t)$ denote the longitudinal position, longitudinal speed and longitudinal acceleration of vehicle i at time t, respectively, $m_i$ denotes the mass of vehicle i, $F_{net_i}(t)$ denotes the net engine force of vehicle i at time t, which mainly depends on the vehicle speed and the throttle angle, $R_i$ denotes the effective gear ratio from the engine to the wheel of vehicle i, $T_{br_i}(t)$ denotes the brake torque of vehicle i at time t, $c_{vi}$ denotes the coefficient of aerodynamic drag of vehicle i, $c_{fi}$ denotes the coefficient of friction force of vehicle i, $d_{mi}(t)$ denotes the mechanical drag of vehicle i at time t.

The following equations can then be derived from the principle of vehicle dynamics when the braking maneuver is deactivated, i.e., vehicle i is accelerating by the net engine force:

$$F_{net_i}(t) = \ddot{x}_i(t)m_i + c_{vi}\dot{x}_i(t)^2 + c_{pi}\dot{x}_i(t) + d_{mi}(t) \quad \text{Eq. 14}$$

and when the braking maneuver is activated, i.e., vehicle i decelerates by the brake torque:

$$T_{br_i}(t) = \frac{\ddot{x}_i(t)m_i + c_{vi}\dot{x}_i(t)^2 + c_{pi}\dot{x}_i(t) + d_{mi}(t)}{R_i} \quad \text{Eq. 15}$$

Figure 4:
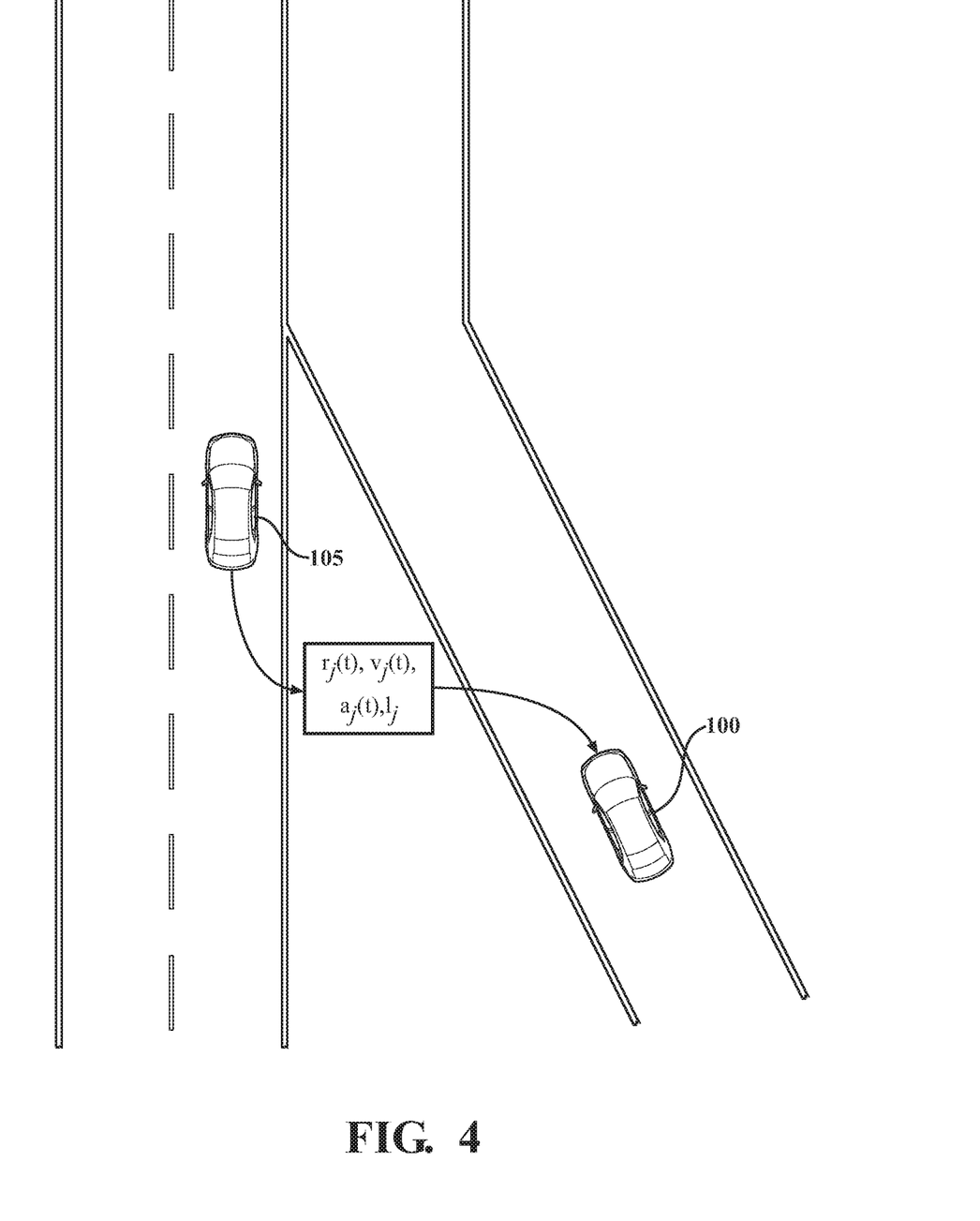
FIG. 4 illustrates V2V communications taking place between an ego vehicle and a competitor vehicle according to the disclosed subject matter.

FIG. 4 illustrates V2V communications taking place between the ego vehicle 100 and the competitor vehicle 105. In this instance, the ego vehicle 100 is the following vehicle i and the competitor vehicle 105 is the preceding vehicle j. The term $l_j$ denotes the length of vehicle j. As can be seen, the following vehicle i receives information from the leading vehicle j through V2V communications, including $r_j(t)$, $v_j(t)$, $a_j(t)$ and $l_j$. Therefore, the problem of forming a predecessor following string of vehicles, given $l_i$ and $l_j$, and initial states $r_i(0)$, $v_i(0)$, $a_i(0)$, $r_j(0)$, $v_j(0)$, $a_j(0)$, can be formulated as how to apply a longitudinal control algorithm such that:

$$r_i(t) \rightarrow r_j(t) - r_{headway} \quad \text{Eq. 16}$$

$$v_i(t) \rightarrow v_j(t) \quad \text{Eq. 17}$$

$$a_i(t) \rightarrow a_j \quad \text{Eq. 18}$$

where "→" means the value on the left-hand side converges to the value on the right-hand side, $r_{headway}$ is the desired distance headway between two vehicles.

A double-integrator consensus longitudinal control algorithm for CAVs is proposed as $$\dot{r}_i(t) = v_i(t) \quad \text{Eq. 19}$$

$$\dot{v}_i(t) = -a_{ij}k_{ij} \cdot [(r_i(t) - r_j(t - \tau_{ij}(t)) + l_j + v_i(t) \cdot (t_{ij}^g(t) + \tau_{ij}(t))) + \gamma_i \cdot (v_i(t) - v_j(t - \tau_{ij}(t))], i, j \in \mathcal{H} \quad \text{Eq. 20}$$

where $\tau_{ij}(t)$ denotes the time-variant communication delay between two vehicles, $t_{ij}^g(t)$ is the time-variant desired time gap between two vehicles, which can be adjusted by many factors like road grade, vehicle mass, braking ability, etc. The term $[l_j + v_i(t) \cdot (t_{ij}^g(t) + \tau_{ij}(t))]$ is another form of the term $r_{headway}$ in equation (16). The longitudinal position and speed converges to position consensus and speed consensus, respectively as:

$$r_i(t) \rightarrow [r_j(t - \tau_{ij}(t)) - l_j - v_i(t) \cdot (t_{ij}^g(t) + \tau_{ij}(t))] \quad \text{Eq. 21}$$

$$v_i(t) \rightarrow (t - \tau_{ij}(t)) \quad \text{Eq. 22}$$

The output of this acceleration control module can then be calculated as:

$$v_i(t + \Delta t) = v_i(t) + \dot{v}_i(t) \cdot \Delta t \quad \text{Eq. 23}$$

where $v_i(t+\Delta t)$ is the advisory speed to the automated controller (for CAVs) or the driver (for human-driven connected vehicles) at the next time step $(t+\Delta t)$.

Figure 5:
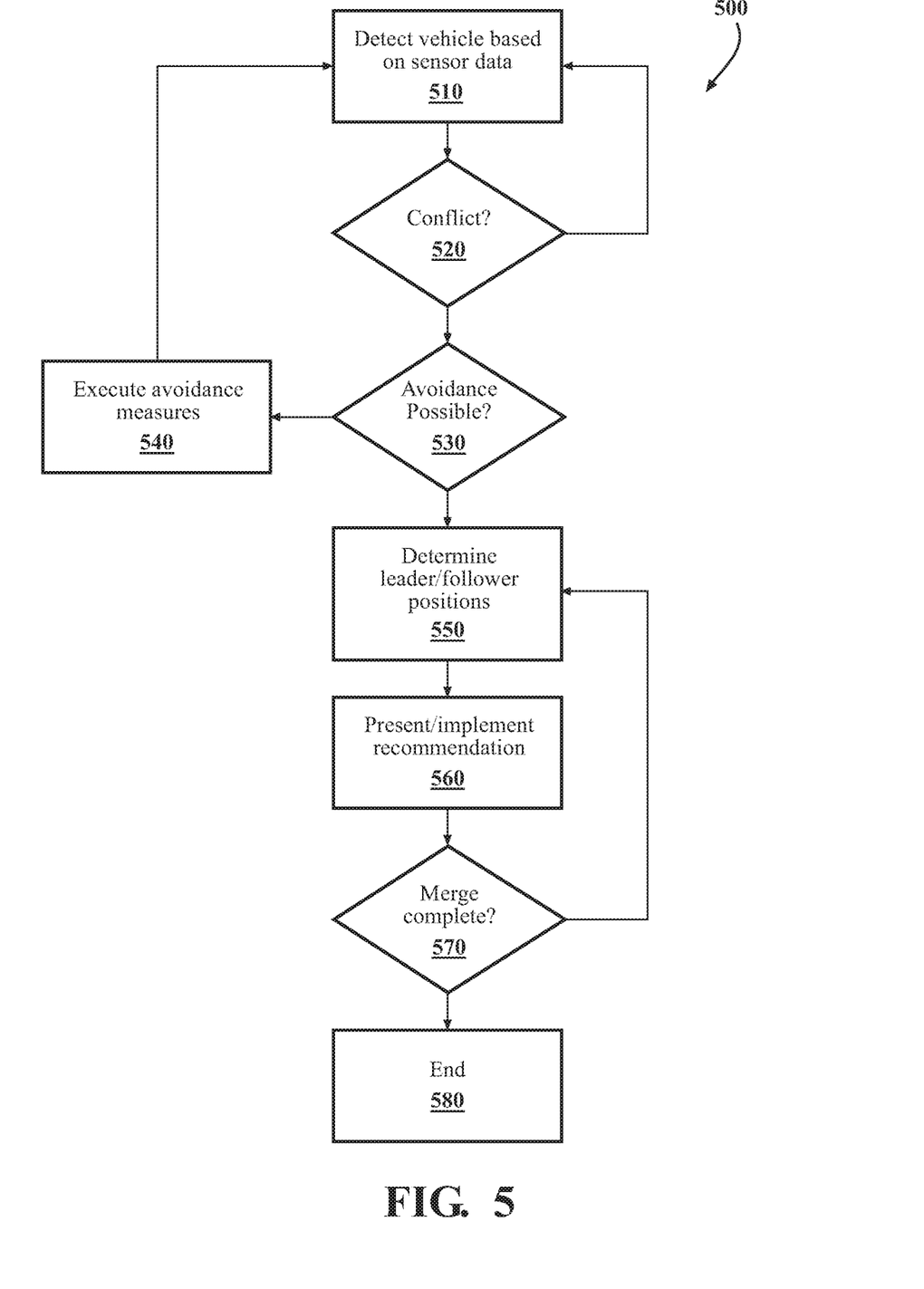
FIG. 5 illustrates a flowchart of a method of executing a merge operation according to the disclosed subject matter.

Additional details and optional features of the vehicle merge control system 170 will now be discussed in connection with FIG. 5, which illustrates a flowchart of a method 500 of executing a merge operation according to the disclosed embodiments. Method 500 will be discussed from the perspective of the vehicle merge control system 170 of FIGS. 1 and 2. While method 500 is discussed in combination with the vehicle merge control system 170, it should be appreciated that the method 500 is also not limited to being implemented within the vehicle merge control system 170 but is instead one example of a system that may implement the method 500.

At operation 510, the vehicle merge control system 170 (e.g., sensor system 120) detects a vehicle (e.g., vehicle 105) in an environment of the ego vehicle 100 based on sensor data 260.

At operation 520, the vehicle merge control system 170 (e.g., conflicts module 220) determines, based at least in part on sensor data 260, whether a conflict exists, i.e., whether the detected vehicle 105 and the ego vehicle 100 are traveling in adjacent lanes that will merge into a single lane and at respective speeds that will result in the detected vehicle entering within a threshold range of the ego vehicle.

In one or more embodiments, to determine whether a conflict exists the conflicts module 220 projects the ego vehicle 100 and the detected vehicle into a future state to determine whether the detected vehicle 105 will enter within the threshold range (e.g., two feet) of the ego vehicle 100. In one or more embodiments, the conflicts module can utilize Equation 24 to identify a potential conflict during an interval of two timesteps:

$$\begin{cases} v_i \times \Delta t + D_{safe} \leq v_j \times \Delta t + d_{ij} \\ \text{or} & \text{, No conflict} \\ v_i \times \Delta t - D_{safe} \geq v_j \times \Delta t + d_{ij} \\ \text{else} & \text{, Potential conflict} \end{cases} \quad \text{Eq. 24}$$

where $v_i$ is the speed of ego vehicle 100, $v_j$ is the speed of the detected vehicle 105, $d_{ij}$ is the intervehicle gap, $\Delta t$ is the simulation timestep length, and $D_{safe}$ is the safe distance (e.g., seven feet).

If there is no conflict, the conflicts module 220 continues to monitor the sensor data for conflicts at operation 510.

If the conflict module 220 determines a potential conflict exists, in one or more embodiments as an optional feature at operation 530 the vehicle merge control system 170 (e.g., conflicts module 220) can determine whether a conflict avoidance measure is possible. For example, the conflicts module 220 can determine whether the ego vehicle 100 is in a mainline and can change to another lane to avoid a potential conflict with a merge lane vehicle. Alternatively, if the ego vehicle 100 is a merge lane vehicle and the detected vehicle 105 is a mainline vehicle, the conflict module 220 can attempt to transmit a message to the detected vehicle 105 requesting the detected vehicle 105 to change lanes.

If an avoidance measure is possible, at operation 540 the conflicts module 220 executes the avoidance measure and returns to monitoring the sensor data for potential conflicts at operation 510.

If a conflict exists and an avoidance measure is not executed, at operation 550, the vehicle merge control system 170 (e.g., game theory decision module 230) determines, based at least in part on a game theory cost function applied to game theory actions, positions to respectively and exclusively assign to the ego vehicle 100 and the detected vehicle 105.

Generally, the game theory decision module 230 can characterize the game as a two-player game with the ego vehicle 100 being a first player and the detected vehicle 105 being a second player. The game can include a set of available actions for each player as: {take lead, follow}. The game theory decision module 230 can evaluate all possible actions in the game (e.g., {P1-take lead, P1-follow, P2-take lead, P2-follow}) for risk analysis in a given timestep using a cost function and reevaluate the actions periodically at one or more subsequent timesteps (e.g., every three seconds, every five seconds, etc.).

Figure 6:
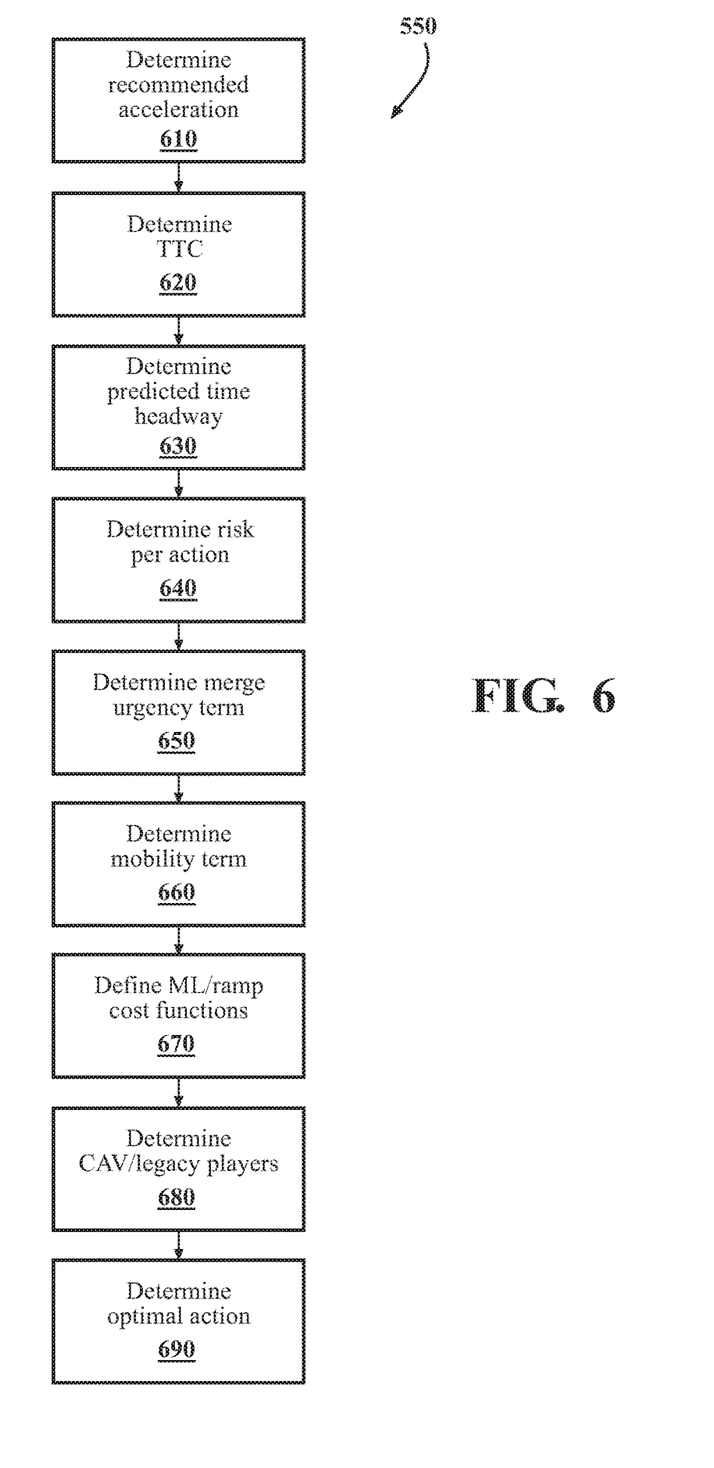
FIG. 6 illustrates a flowchart of a method of determining assigned positions based on a game theory cost function according to the disclosed subject matter.

Details of operation 550 are presented in FIG. 6, which illustrates a flowchart of a method 600 of determining assigned positions based on a game theory cost function, according to the disclosed embodiments. The method 600 is one example implementation according to the disclosed embodiments. In other implementations, one or more of the operations may be executed in a different order or may be removed.

Assume the ego vehicle 100 is P1 in the game and a detected vehicle is P2. At operation 610, the game theory decision module 230 determines a recommended acceleration for P1, for example, based on Equations 20-23.

At operation 620, the game theory decision module 230 can determine a time-to-collision (TTC) based on the recommended acceleration and contextual state data (e.g., speed of the P1 vehicle, speed of the P2 vehicle, size of gap between P1 and P2, etc.), for example, based on Equation 1.

At operation 630, the game theory decision module 230 can determine a predicted time headway between P1 and P2, for example, based on Equation 2.

At operation 640, the game theory decision module 230 can calculate a risk value for each action of the game based at least in part on the TTC and/or the predicted time headway, for example, based on Equations 3-4.

At operation 650, the game theory decision module 230 can determine a merge urgency term that indicates a level of urgency to complete a merge maneuver that may increase from the perspective of a merge lane vehicle (i.e., P1 or P2) as P1 and P2 draw nearer to the merge point 340. In one or more embodiments, the game theory decision module 230 can determine the merge urgency term based on Equation 5.

At operation 660, the game theory decision module 230 can determine a mobility term that indicates a bias for a preference to maintain or increase a current speed and complete the merge as quickly as possible within safe limits. In one or more embodiments, the game theory decision module 230 can determine the mobility term as a term that increases cost when a player decelerates, for example, based on Equation 6.

At operation 670, the game theory decision module 230 can define a cost function for the mainline vehicle and a cost function for the merge lane vehicle. The separate cost functions can consider the different risks and goals of the mainline vehicle and the merge lane vehicle. For example, the mainline vehicle cost function can include a collision risk term and a mobility term, while the merge lane vehicle cost function can include a collision risk term, a mobility term and a merge urgency term. In one or more embodiments, the game theory decision module 230 can define the mainline vehicle cost function based on Equation 7 and define the merge lane vehicle cost function based on Equation 8.

In one or more embodiments, at operation 680 the game theory decision module 230 can optionally determine whether P1 and P2 are CAVs or legacy vehicles. If both players are CAVs, more information sharing and collaboration is possible. For example, when both players are CAVs, both may implement an implementation of the disclosed vehicle merge control system 170 and both may calculate and share cost function results. In this case, the P1 can collaborate with P2 to determine merge position assignments according to a sum cost based on the cost function associated with P1 and a second cost function associated with P2. The two cost functions can be defined differently, for example, each including different terms based on which vehicle is in the merge lane and which vehicle is in the mainline. However, if P1 is a CAV vehicle and P2 is a legacy vehicle, less collaboration may be possible.

At operation 690, the game theory decision module 230 determines an optimal action for each player based on the cost function analysis. In one or more embodiments, if both players are CAVs the game theory decision module 230 determines the role designation based on Table 2. However, if only one player is a CAV the game theory decision module 230 can determine the role designations based on Table 1.

Referring back to FIG. 5, at operation 560 the vehicle merge control system 170 (e.g., acceleration control module 240) can output, present or implement the recommended action, i.e., control the ego vehicle 100 to achieve an acceleration corresponding to the position assigned to the ego vehicle 100. In the case of the ego vehicle 100 being manually driven, the acceleration control module 240 can provide a notification indicating a recommended action (e.g., take the lead position in the merger) and a recommended speed and/or acceleration associated with the recommended action. In the case of the ego vehicle 100 being autonomously driven, the acceleration control module 240 can communicate the recommended action to the appropriate vehicle control system and/or directly transmit commands to actuate vehicle control systems to implement the recommendation.

At operation 570 the vehicle merge control system 170 determines whether the merge is complete. If the merge is not yet complete, the vehicle merge control system 170 repeats operations 550-570 on a periodic basis to update the recommendation if necessary, based on current data. When the merge is complete, the process ends at 580.

Thus, the disclosed vehicle merge control system 170 can identify an upcoming conflict in as the vehicle 100 approaches a merge lane, for example, based at least in part on sensor data indicating that a detected vehicle and the ego vehicle 100 are traveling: 1) in adjacent lanes that will merge into a single lane, and 2) at respective speeds that will result in the detected vehicle entering within a threshold range of the ego vehicle. The disclosed vehicle merge control system 170 can determine, upon identification of the conflict, merge position assignments for the ego vehicle 100 and the detected vehicle based at least in part on a game theory cost function applied to game theory actions that result in the merge position assignments exclusively being either a lead vehicle or follower vehicle. The disclosed vehicle merge control system 170 can output an acceleration rate to achieve the merge position assignment for the ego vehicle 100. The output can be transmitted, for example, to a vehicle control system to automatically implement the acceleration rate or to a user interface and converted into a displayed recommended speed/acceleration. The disclosed vehicle merge control system 170 can periodically update the recommendation, as described above.

FIG. 1, which shows various components of the vehicle 100, will now be discussed in full detail as an example environment within which the system and methods disclosed herein may operate.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., ego driver) provides inputs to the vehicle 100 to perform a portion of the navigation and/or maneuvering of the vehicle 100 along a travel route.

In some instances, the vehicle 100 is configured to switch selectively between an autonomous mode, one or more semi-autonomous operational modes, and/or a manual mode. Such switching can be implemented in a suitable manner, now known or later developed. "Manual mode" means that all or a majority of the navigation and/or maneuvering of the vehicle is performed according to inputs received from a user (e.g., human driver). In one or more arrangements, the vehicle 100 can be a conventional vehicle that is configured to operate in only a manual mode.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can implement the database 119 (FIG. 2) and can further include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself, such as one or more actual states of the vehicle 100. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more RADAR sensors 123, one or more LIDAR sensors 124, one or more sonar sensors 125, and/or one or more cameras 126, e.g., one or more monocular cameras. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger), such as, for example, rest area characteristics preferences.

The vehicle 100 can include an output system 135. An "output system" includes any device, component, or arrangement or groups thereof that enable information/data (e.g., a recommended acceleration rate) to be presented to a vehicle passenger (e.g., a person, a vehicle passenger, etc.). The output system 135 can function as part of an interface that can present, for example, forecast notifications as described above.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed. One or more of these systems can by operably connected to wheels of the vehicle in a manner that allows individual application of control or commands implemented by the respective system.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110 and/or the autonomous driving module(s) 160 can be operatively connected to communicate with the various vehicle systems 140 and/or individual components thereof. For example, returning to FIG. 1, the processor(s) 110 and/or the autonomous driving module(s)

160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140 and, thus, may be partially or fully autonomous.

The processor(s) 110 and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuator(s) 150. The actuator(s) 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 can be configured to determine travel path(s) and determine current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations in aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vehicle merge control system for an ego vehicle, comprising:
   one or more sensors that generate sensor data that indicate a detected vehicle in an environment of the ego vehicle;
   one or more processors; and
   a memory communicably coupled to the one or more processors and storing:
      a first set of instructions that when executed by the one or more processors cause the one or more processors to:
         determine whether the ego vehicle is in a merge lane or a mainline, the merge lane being a lane that ends by merging into another lane, the mainline being the other lane into which the merge lane merges; and
         determine, based at least in part on the sensor data, that a conflict exists based on determining that the detected vehicle and the ego vehicle are traveling:
         1) in adjacent lanes that will merge into a single lane, and 2) at respective speeds that will result in the detected vehicle entering within a threshold range of the ego vehicle;
      a second set of instructions that when executed by the one or more processors cause the one or more processors to determine, when a conflict exists, merge position assignments for the ego vehicle and the detected vehicle based at least in part on a game theory cost function applied to game theory actions that result in the merge position assignments exclusively being either a lead vehicle or a follower vehicle, wherein, in response to:
         the ego vehicle being in the merge lane, the game theory cost function is a merge lane game theory cost function; and
         the ego vehicle being in the mainline, the game theory cost function is a mainline game theory cost function; and a third set of instructions that when executed by the one or more processors cause the one or more processors to output an acceleration rate to achieve a merge position assignment, of the merge position assignments, for the ego vehicle.

2. The vehicle merge control system of claim 1, wherein the second set of instructions further includes instructions to:
   determine a recommended acceleration rate;
   determine a predicted time-to-collision (TTC) and a predicted time headway between the ego vehicle and the detected vehicle based at least in part on the recommended acceleration rate;
   determine a risk, per game theory action of the game theory actions, based at least in part on the predicted TTC and/or the predicted time headway; and
   define the game theory cost function based at least in part on the risk.

3. The vehicle merge control system of claim 1, wherein the second set of instructions further includes instructions to define the game theory cost function to include at least a safety term that increases cost in accordance with an amount of risk of a collision, and a mobility term that increases cost when a player decelerates.

4. The vehicle merge control system of claim 1, wherein the second set of instructions further includes instructions to define the game theory cost function to include at least a merge urgency term that indicates a level of urgency to complete a merge maneuver, from a perspective of a merge lane vehicle, that increases over time.

5. The vehicle merge control system of claim 1, wherein the second set of instructions further includes instructions to:
   determine that the detected vehicle is engaged in collaborative communication with the ego vehicle; and
   collaborate with the detected vehicle to determine the merge position assignments according to a sum cost based on the game theory cost function and a second game theory cost function associated with the detected vehicle,
   wherein the game theory cost function is defined differently from the second game theory cost function.

6. The vehicle merge system of claim 1, wherein the third set of instructions further includes instructions to determine the acceleration rate based at least in part on a position of a preceding vehicle, a speed of the preceding vehicle, and an acceleration of the preceding vehicle.

7. A method of controlling a merge maneuver for an ego vehicle, comprising:
   generating sensor data that indicate a detected vehicle in an environment of the ego vehicle;
   determining whether the ego vehicle is in a merge lane or a mainline, the merge lane being a lane that ends by merging into another lane, the mainline being the other lane into which the merge lane merges;
   identifying a conflict based at least in part on the sensor data indicating that the detected vehicle and the ego vehicle are traveling: 1) in adjacent lanes that will merge into a single lane, and 2) at respective speeds that will result in the detected vehicle entering within a threshold range of the ego vehicle;
   determining, upon identification of the conflict, merge position assignments for the ego vehicle and the detected vehicle based at least in part on a game theory cost function applied to game theory actions that result in the merge position assignments exclusively being either a lead vehicle or a follower vehicle, wherein, in response to:
      the ego vehicle being in the merge lane, the game theory cost function is a merge lane game theory cost function; and
      the ego vehicle being in the mainline, the game theory cost function is a mainline game theory cost function; and
   outputting an acceleration rate to achieve a merge position assignment, of the merge position assignments, for the ego vehicle.

8. The method of claim 7, further comprising:
   determining a recommended acceleration rate;
   determining a predicted time-to-collision (TTC) and predicted time headway between the ego vehicle and the detected vehicle based at least in part on the recommended acceleration rate;
   determining a risk, per game theory action of the game theory actions, based at least in part on the TTC and/or the predicted time headway; and
   defining the game theory cost function based at least in part on the risk.

9. The method of claim 7, further comprising defining the game theory cost function to include at least a safety term that increases cost in accordance with an amount of risk of a collision, and a mobility term that increases cost when a player decelerates.

10. The method of claim 7, further comprising defining the game theory cost function to include at least a merge urgency term that indicates a level of urgency to complete a merge maneuver, from a perspective of a merge lane vehicle, wherein a value of the merge urgency term is capable of being increased.

11. The method of claim 7, further comprising:
    determining that the detected vehicle is engaged in collaborative communication with the ego vehicle; and
    collaborating with the detected vehicle to determine the merge position assignments according to a sum cost based on the game theory cost function and a second game theory cost function associated with the detected vehicle,
    wherein the game theory cost function is defined differently from the second game theory cost function.

12. The method of claim 7, further comprising determining the acceleration rate based at least in part on a position of a preceding vehicle, a speed of the preceding vehicle, and an acceleration of the preceding vehicle.

13. A non-transitory computer-readable medium for controlling a merge maneuver for an ego vehicle, including instructions that, when executed by one or more processors, cause the one or more processors to:
    obtain sensor data that indicate a detected vehicle in an environment of the ego vehicle;
    determine whether the ego vehicle is in a merge lane or a mainline, the merge lane being a lane that ends by merging into another lane, the mainline being the other lane into which the merge lane merges;
    identify a conflict based at least in part on the sensor data indicating that the detected vehicle and the ego vehicle are traveling: 1) in adjacent lanes that will merge into a single lane, and 2) at respective speeds that will result in the detected vehicle entering within a threshold range of the ego vehicle;
    determine, upon identification of the conflict, merge position assignments for the ego vehicle and the detected vehicle based at least in part on a game theory cost function applied to game theory actions that result in the merge position assignments exclusively being either a lead vehicle or a follower vehicle, wherein, in response to:
- the ego vehicle being in the merge lane, the game theory cost function is a merge lane game theory cost function; and
- the ego vehicle being in the mainline, the game theory cost function is a mainline game theory cost function; and output an acceleration rate to achieve a merge position assignment, of the merge position assignments, for the ego vehicle.

14. The non-transitory computer-readable medium of claim 13, further comprising instructions to:
- determine a recommended acceleration rate;
- determine a predicted time-to-collision (TTC) and predicted time headway between the ego vehicle and the detected vehicle based at least in part on the recommended acceleration rate;
- determine a risk, per game theory action, based at least in part on the TTC and/or the predicted time headway; and
- define the game theory cost function based at least in part on the risk.

15. The non-transitory computer-readable medium of claim 13, further comprising instructions to define the game theory cost function to include at least a safety term that increases cost in accordance with an amount of risk of a collision, and a mobility term that increases cost when a player decelerates.

16. The non-transitory computer-readable medium of claim 13, further comprising instructions to define the game theory cost function to include at least a merge urgency term that indicates a level of urgency to complete a merge maneuver, from a perspective of a merge lane vehicle, wherein a value of the merge urgency term is capable of being increased.

17. The non-transitory computer-readable medium of claim 13, further comprising instructions to:
- determine that the detected vehicle is engaged in collaborative communication with the ego vehicle; and
- collaborate with the detected vehicle to determine the merge position assignments according to a sum cost based on the game theory cost function and a second game theory cost function associated with the detected vehicle,
- wherein the game theory cost function is defined differently from the second game theory cost function.

18. The vehicle merge control system of claim 2, wherein the instructions to determine the risk include instructions to perform a hyperbolic tangent function.

19. The method of claim 7, further comprising determining whether a conflict avoidance measure is possible.

20. The non-transitory computer-readable medium of claim 14, wherein the instructions to determine the risk include instructions to perform a hyperbolic tangent function.

* * * * *